US009942673B2

(12) United States Patent
Boretzki (10) Patent No.: US 9,942,673 B2
(45) Date of Patent: Apr. 10, 2018

(54) METHOD AND ARRANGEMENT FOR FITTING A HEARING SYSTEM

(75) Inventor: Michael Boretzki, Ruti (CH)

(73) Assignee: SONOVA AG, Staefa (CH)

( * ) Notice: Subject to any disclaimer, the term of this patent is extended or adjusted under 35 U.S.C. 154(b) by 616 days.

(21) Appl. No.: 12/742,527

(22) PCT Filed: Nov. 14, 2007

(86) PCT No.: PCT/EP2007/062356
§ 371 (c)(1),
(2), (4) Date: May 12, 2010

(87) PCT Pub. No.: WO2008/025858
PCT Pub. Date: Mar. 6, 2008

(65) Prior Publication Data
US 2010/0272297 A1    Oct. 28, 2010

(51) Int. Cl.
*H04R 29/00*    (2006.01)
*H04R 25/00*    (2006.01)

(52) U.S. Cl.
CPC .......... *H04R 25/70* (2013.01); *H04R 25/305* (2013.01); *H04R 2225/41* (2013.01)

(58) Field of Classification Search
USPC ...................................................... 381/312
See application file for complete search history.

(56) References Cited

U.S. PATENT DOCUMENTS 3,745,674 A    7/1973 Thompson et al.
4,067,049 A *  1/1978 Kelly et al. ................... 386/285
8,135,138 B2 * 3/2012 Wessel et al. .................. 381/60
8,341,662 B1 * 12/2012 Bassett et al. ................. 725/32
2005/0271219 A1 * 12/2005 Bruelle-Drews ............... 381/86

(Continued)

FOREIGN PATENT DOCUMENTS

EP    1617705 A2    1/2006
FR    2664494 A1    1/1992
WO    2007113339 A2    10/2007

OTHER PUBLICATIONS

International Search Report for PCT/EP2007/062356 dated Jul. 22, 2008.
Written Opinion for PCT/EP2007/062356 dated Jul. 22, 2008.

*Primary Examiner* — Christopher Uhlir
(74) *Attorney, Agent, or Firm* — Pearne & Gordon LLP (57) ABSTRACT

The method for adjusting a hearing system (2) to the preferences of a user (3) of the hearing system comprises
a) playing an audio sequence to said user (3);
wherein the audio sequence comprises a first sound object representative of a first real-life sound source and a second sound object representative of a second real-life sound source;
b) receiving an input (R) in response to step a);
c) adjusting at least one audio processing parameter (P) of said hearing system (2) in dependence of said input (R).
Preferably, the method further comprises
d) providing the user (3) synchronously with step a) with a visualization of a scene to which said audio sequence belongs; and
providing a user input (U) which is indicative of a sound source or of a sound object or of an instant in or a portion of the audio sequence; and
automatically selecting an audio processing parameter (P) of the hearing system (2) in dependence of the user input (U) and offering the selected audio processing parameter (P) for adjusting.

13 Claims, 4 Drawing Sheets

(56) References Cited

U.S. PATENT DOCUMENTS

| | | | |
|---|---|---|---|
| 2006/0098831 A1* | 5/2006 | Kaiser et al. | 381/312 |
| 2007/0172088 A1 | 7/2007 | Olsen et al. | |
| 2007/0217636 A1* | 9/2007 | Schwob | 381/312 |
| 2007/0253556 A1* | 11/2007 | Nakao et al. | 381/2 |
| 2008/0063215 A1* | 3/2008 | Porwal et al. | 381/77 |
| 2008/0165988 A1* | 7/2008 | Terlizzi et al. | 381/119 |

* cited by examiner

METHOD AND ARRANGEMENT FOR FITTING A HEARING SYSTEM

TECHNICAL FIELD

The invention relates to the field of hearing device and hearing systems. More particularly, it relates to the fitting of hearing device and hearing system, wherein fitting means adjusting the signal processing properties of the hearing system to the preferences of the user of the hearing system. The invention relates to methods and apparatuses according to the opening clauses of the claims. Under a hearing device, a device is understood, which is worn in or adjacent to an individual's ear with the object to improve the individual's acoustical perception. Such improvement may also be barring acoustic signals from being perceived in the sense of hearing protection for the individual. If the hearing device is tailored so as to improve the perception of a hearing impaired individual towards hearing perception of a "standard" individual, then we speak of a hearing-aid device. With respect to the application area, a hearing device may be applied behind the ear, in the ear, completely in the ear canal or may be implanted.

A hearing system comprises at least one hearing device. In case that a hearing system comprises at least one additional device, all devices of the hearing system are operationally connectable within the hearing system. Typically, said additional devices such as another hearing device, a remote control or a remote microphone, are meant to be worn or carried by said individual.

BACKGROUND OF THE INVENTION

The fitting of hearing devices is typically carried out in an iterative way: The hearing device user visits his hearing device professional such as an audiologist or hearing device acoustician, who carries out hearing tests with synthetic test tones such as sine tones and noise signals. Depending on how the user reacts to the test tones, the hearing device professional will adjust certain audio processing parameters of the hearing system in a certain way. Then, the user uses his adjusted hearing device in every-day life, trying to find out, where hearing problems still persist. Then, the user will visit his hearing device professional again and report his observations, and the hearing device professional will "fine-tune" the hearing device, i.e. make further adjustments to audio processing parameters of the hearing system. The newly adjusted hearing system will be tested in real life again, followed by another visit at the hearing device professional's office and so on.

This process consumes a lot of time.

In EP 1 617 705 A2, it has been suggested to let the user himself fit his hearing device. In this case, the hearing device itself can generate test tones. This way, all or many visits at the hearing device professional's office are unnecessary. Unfortunately, not every hearing device user is able and willing to carry out the fitting on his own. It has been suggested to use as test tones, for example, sounds known to the user from everyday life, such as the sound of a triangle or the sound of a ship horn.

In US 2007/0172088 A1, it is disclosed to fit a hearing-aid device using means for selecting simultaneous settings relating to two or more different audio processing parameters, i.e. adjusting parameters composed of two or more parameters.

It is desirable to provide an alternative way of fitting a hearing system.

SUMMARY OF THE INVENTION

Accordingly, one object of the invention is to create an alternative way of fitting a hearing system.

In particular, a method for adjusting a hearing system to the preferences of a user of said hearing system, a corresponding arrangement for adjusting a hearing system to the preferences of a user of said hearing system and a corresponding computer program product such as one suitable to adjust a hearing system to the preferences of a user of said hearing system, shall be provided. In addition, a corresponding use and a corresponding computer-readable medium shall be provided.

Another object of the invention is to provide a way of fitting a hearing system, which leads to a good fitting result within a relatively short time.

Another object of the invention is to provide a way of fitting a hearing system, which leads to a good fitting result with only a relatively small amount of visits at a hearing device professional's office.

Another object of the invention is to provide a way of fitting a hearing system, which reduces the hearing device professional's resources required for fitting the hearing system in terms of time and/or in terms of expertise such as experience and knowledge.

Another object of the invention is to provide a way of fitting a hearing system, which makes the hearing system user feel more comfortable during fitting sessions.

Another object of the invention is to provide a way of fitting a hearing system, which can be accomplished by a hearing system user without support from a hearing device professional or with little support from a hearing device professional.

Another object of the invention is to provide a more effective way of fitting a hearing system.

Another object of the invention is to provide a more efficient way of fitting a hearing system.

Further objects emerge from the description and embodiments below.

At least one of these objects is at least partially achieved by apparatuses and methods according to the patent claims.

The method for adjusting a hearing system to the preferences of a user of said hearing system comprises the steps of
a) playing an audio sequence to said user;
wherein said audio sequence comprises a first sound object representative of a first real-life sound source and a second sound object representative of a second real-life sound source;
b) receiving an input in response to step a);
c) adjusting at least one audio processing parameter of said hearing system in dependence of said input.

Through this, an improved fitting result can be achieved and/or the time that has to be spent during fitting can be reduced. Using such an audio sequence allows to consider and balance trade-offs which exist in hearing device fitting, and the use of sounds known to the user from real life tends to lead rather soon to rather good fitting results.

To give a very simple example, let us consider a first sound object representing soft speech, and a second sound object representing rather loud speech. If these sound objects were used separately as test sounds for fitting, the fitting result would tend to be such that both sound objects are adjusted to a moderate loudness, employing a quite high degree of compression. On the other hand, using an audio sequence containing both, soft speech and loud speech, e.g., in alternating way, the dynamics problem becomes immediately apparent, and the related trade-off can be balanced well.

In one embodiment, said audio sequence represents a real-life situation. Or, said audio sequence is a realistic composition of acoustic events of real-life. This makes the fitting procedure more pleasant for the user, and the fitting result will tend to be better adapted to the user's real life. Advantages that otherwise would be achieved by letting the fitting take place during the user's normal life can be achieved this way, while maintaining the advantage that it is possible that a hearing device professional carries out the fitting and that the fitting can take place in one single place such as a hearing device professional's office.

Said audio sequence can, e.g., comprise synthesized and/or digitally sampled sound components. Typically, it will be a composition of several separately available sound bits such as digital sound samples.

Said audio sequence can be adjustable, e.g., by hearing device professional. This way, it can be adapted to specific needs of the hearing device user.

Typically, said audio sequence will comprise three or more sound objects.

A sound object may comprise more than one sound bits. When a sound bit of a sound object is played during a sound sequence, the corresponding sound object sounds during said audio sequence.

Said input mentioned in step b) is typically provided to a fitting arrangement. It is typically provided by a hearing device professional, usually in reaction to a reaction of said user, such as comments typically provided orally.

Steps b) and c), i.e. said receiving and said adjusting, are typically carried out by a fitting arrangement.

A fitting arrangement typically comprises a computer system and fitting software running on said computer system.

In one embodiment, said first and said second sound objects sound simultaneously during at least a portion of said audio sequence. It is—in particular in view of possible trade-offs in hearing device fitting—advantageous to have overlapping sound objects within a sound sequence used for fitting. It allows to hear sound objects in relation to each other.

In one embodiment, during at least a portion of said audio sequence, said first sound object sounds without said second sound object sounding simultaneously. Accordingly, said first sound object can be heard separately during said audio sequence, at least separately from the second sound object. A sequential, e.g., alternating, occurrence of sound objects allows to hear relations between the sound objects very well, which is advantageous in view of trade-offs in fitting.

In one embodiment, the method comprises the step of
d) providing said user synchronously with step a) with a
visualization of a scene to which said audio sequence belongs.

Such a visualization can provide a strongly enhanced realism to the audio sequence. Furthermore, it can be used to simplify the communication between the user and a hearing device professional.

Said visualization typically matches the acoustic events belonging to the scene. Accordingly, from the visualization, it can be made clear to the user, what is happening acoustically.

Said visualization can, e.g., be or comprise a video sequence. It can comprise recorded (filmed) video clips and/or computer-generated animations or simulations.

In a computer-generated animation or simulation, it is relatively easy to adapt a visualization to different audio sequences. This can be advantageous, in particular if the audio sequence comprises human speech. Since many hearing impaired people employ some kind of lip reading, they might get seriously confused if visually perceived lip movements do not correspond to acoustically perceived speech. Therefore, if a similar video sequence and a similar audio sequence shall be produced for different languages and if the visualization is a recorded video sequence, it would be advisable to record a different video sequence for each language. If, on the other hand, the visualization is a computer-generated animation or simulation, it would be possible to use the one and the same visualization and adapt (only) the lip movements, so as to simulate the effect of different languages. Even in a recorded video sequence, it is today possible to digitally edit the video data so as to change lip movements accordingly, e.g., based on separately recorded lip movements for the different lip movements. Typically, with separately recorded lip movements, the respective speech will be recorded simultaneously.

It is possible to provide that, in the fitting software, a language can be selected, so as to provide audio sequences comprising speech of the selected language and, if available, visualizations adapted—with respect to visual lip movements—to the selected language.

A visual display, e.g., a TV set or a computer screen, can be used for displaying said visualization.

In one embodiment, movements of sound sources and/or visible changes at sound sources are visible in the visualization, e.g., mouth movements and/or optical effects highlighting currently-active sound sources.

Said visualization can be adjustable, e.g., by a hearing device professional, e.g., with respect to its length and/or to the order of events.

In one embodiment, the method comprises the step of
h) providing a user input;
wherein said user input comprises an indication of a sound source occurring in said visualization.

Typically, step h) is carried out by said user.

Usually, said user input is received during step a).

A fitting arrangement and/or a hearing device professional can be provided with said user input.

Step h) can be carried out, e.g., by pointing at a display used for displaying the visualization, either manually or using computer mouse or another pointing device, typically selecting a point or an area in the visualization display at a certain instant in time; or it can be carried out by orally communicating to a hearing device professional.

Typically, such a user input will be provided when the user has problems in conjunction with the indicated sound source, e.g., because he does not at all or not properly hear sound belonging to the indicated sound source.

In one embodiment, the method comprises the step of
i) providing a user input;
wherein said user input is indicative of at least one of
one of the sound objects comprised in said audio sequence; and
an instant in or a portion of said audio sequence.

Note that this embodiment does not require a visualization of a scene to which the audio sequence belongs.

Typically, step i) is carried out by said user.

Usually, said user input is received during step a).

Typically, such a user input will be provided when the user has problems in conjunction with the indicated sound object or at the indicated time during the audio sequence.

An indication of one of the sound objects may be provided, e.g., by selecting an instant during said sequence at which only a single sound object sounds during said audio sequence, and/or by (typically orally) informing a hearing device professional and/or—if a visualization is available—by pointing out a sound source, e.g., using a computer mouse for clicking at a sound source which—according to the visualization—is currently sounding but is not heard because of other sound sources sounding simultaneously.

An indication of an instant in or a portion of said audio sequence can be provided, e.g., by pushing a button or by (typically orally) informing a hearing device professional, or—if a visualization is available—by touching a display displaying the visualization.

In one embodiment, the method comprises the step of g) receiving said user input in a fitting arrangement;

wherein said fitting arrangement carries out the step of e) automatically selecting at least one audio processing parameter of said hearing system in dependence of said user input.

This embodiment provides most valuable help to the individual carrying out the fitting (typically the hearing device professional).

Said at least one selected audio parameter can be, e.g., an overall output level, an output level in a certain frequency range, a compression ratio, a filter cutoff frequency, a beam former angle or a composed parameter changing several other parameters simultaneously.

For example, a look-up table may be provided which provides for every instant of said audio sequence or for every sound source/sound object or for combination of both, one or more appropriate parameters.

It is possible to provide that each sound object (or at least a portion of the sound objects) is representative of a certain sound type each, wherein a sound belonging to a certain sound type is characterized by at least one characteristic property of the sound or rather by a characteristic combination of certain properties of the sound. Examples for sound types are soft speech, speech in noise, loud music, high-frequency noise. Examples for said properties of the sound are its spectral content, its average level, its dynamic range. For each sound type, a set of (one or more) parameters is known (stored or obtainable), which are particularly well suited for influencing sounds of the respective sound type while having less influence on (most) sounds of other sound types. If the sound sequence is composed in such a way, said automatic selection is readily accomplished. Naturally-sounding audio sequences can be realized, which are acoustically quite complex, but nevertheless, given an indication by the user that he has trouble with a certain sound object/sound source or during a certain portion of the sequence, it will be possible to offer a limited number of parameters for adjustment, which are well suited for solving the indicated hearing problem while preserving settings that work well with other sound objects/sound sources or in other situations.

In one embodiment, the method comprises the step of f) offering said selected at least one audio processing parameter for adjustment.

This can be accomplished, e.g., by displaying one or more parameter changing means such as sliders or buttons on a display, and/or by highlighting and/or labelling suitable controls, and/or by assigning a suitable function to one or more available controls.

The arrangement for adjusting a hearing system to the preferences of a user of said hearing system comprises
 a control unit;
 a first interface unit operationally connectable to said control unit and to said hearing system;
 a storage unit comprising data representative of an audio sequence comprising a first sound object representative of a first real-life sound source and a second sound object representative of a second real-life sound source;
 an input unit operationally connectable to said control unit, for receiving input descriptive of an adjustment of at least one audio processing parameter of said hearing system;
wherein said control unit is configured to play said audio sequence to said user and to carry out said adjustment.

Said arrangement can also be referred to as fitting arrangement.

Said control unit typically comprises at least one processor plus software running on said at least one processor.

Said data can be data describing an audio stream, e.g., digital sound sampling data. Or said data can comprise bits of audio stream and data descriptive of how these bits of audio stream can be composed to represent said audio sequence. Furthermore, it is possible to use sound description data such as control signals for a sound synthesizer instead of or in addition to bits of audio stream.

In one embodiment, said audio sequence is composed such that said first and said second sound objects sound simultaneously during at least a portion of said audio sequence.

In one embodiment, said audio sequence is composed such that—during at least a portion of said audio sequence—said first sound object sounds without said second sound object sounding simultaneously.

In one embodiment, said arrangement comprises—operationally connectable to said control unit—a display unit and a storage unit comprising data descriptive of a visualization of a scene to which said audio sequence belongs, wherein said control unit is configured to display—using said display unit—said visualization synchronously with said playing of said audio sequence.

Said visualization unit can comprise, e.g., an optical display, a TV screen, a computer monitor.

In one embodiment, the arrangement comprises a user interface allowing an individual to select a sound source occurring in said visualization.

Said user interface can comprise, e.g., a touch screen and/or a computer mouse.

Typically, said individual is said user. Said individual can also be a hearing device professional.

Said user interface can be identical with or (fully or partially) different from said input unit.

In one embodiment, said arrangement comprises a user interface allowing an individual to select at least one of
 one of the sound objects comprised in said audio sequence; and
 an instant in or a portion of said audio sequence.

Said individual can be the hearing system user or the hearing system fitter (hearing device professional).

Said user interface can be same user interface or a (fully or partially) different user interface as the one of the before-mentioned embodiment.

Said user interface can be identical with or (fully or partially) different from said input unit.

In one embodiment, said control unit is adapted to automatically selecting at least one audio processing parameter of said hearing system in dependence of said selection (of said sound source, said sound object and/or said instant or portion).

In one embodiment, said control unit is adapted to offering said selected at least one audio processing parameter for adjustment.

The computer program product comprises program code for causing a computer system to perform the steps of
A) playing an audio sequence to a user of a hearing system;
wherein said audio sequence comprises a first sound object representative of a first real-life sound source and a second sound object representative of a second real-life sound source;
B) receiving an input in response to step a);
C) adjusting at least one audio processing parameter of said hearing system in dependence of said input.

Typically, said program code is or comprises a fitting software.

Said input can be provided by the hearing system user or is—more typically—provided by a hearing device professional, for carrying out said the adjustment.

In one embodiment, said program code is adapted to causing said computer system to perform the step of
D) providing—synchronously with step a)—a visualization of a scene to which said audio sequence belongs.

In one embodiment, said program code is adapted to causing said computer system to perform the step of
H) receiving a user input;
wherein said user input comprises an indication of a sound source occurring in said visualization.

In one embodiment, said program code is adapted to causing said computer system to perform the step of
J) receiving a user input;
wherein said user input is indicative of at least one of
one of the sound objects comprised in said audio sequence; and
an instant in or a portion of said audio sequence.

In one embodiment, said program code is adapted to causing said computer system to perform the step of
E) automatically selecting at least one audio processing parameter of said hearing system in dependence of said user input.

In one embodiment, said program code is adapted to causing said computer system to perform the step of
F) indicating a possibility for adjusting said selected at least one audio processing parameter.

The computer-readable medium according to the invention comprises program code as described above.

The use according to the invention is a use of an audio sequence comprising a first sound object representative of a first real-life sound source and a second sound object representative of a second real-life sound source as signals to be perceived by a hearing system user in adjusting said hearing system to the preferences of said user.

The advantages of the methods correspond to the advantages of corresponding apparatuses, computer programs and uses, and vice versa.

Further embodiments and advantages emerge from the dependent claims and the figures.

BRIEF DESCRIPTION OF THE DRAWINGS

Below, the invention is described in more detail by means of examples and the included drawings. The figures show.

The reference symbols used in the figures and their meaning are summarized in the list of reference symbols. Generally, alike or alike-functioning parts are given the same or similar reference symbols. The described embodiments are meant as examples and shall not confine the invention.

DETAILED DESCRIPTION OF THE INVENTION

Figure 1:
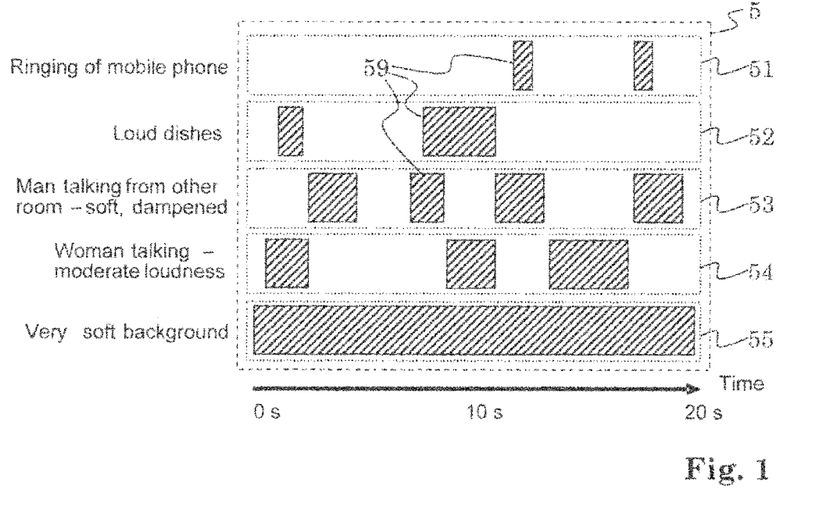
FIG. 1 a schematic illustration of an audio sequence.

FIG. 1 is a schematic illustration of an audio sequence 5 that can be used in the invention. The audio sequence 5 comprises five sound objects 51,52,53,54,55, each comprising one or more sound bits 59. Each sound object is representative of a real-life sound source, which is indicated in the left portion of FIG. 1. The audio sequence 5 represents a real-life situation (more precisely: a real-life acoustic situation or flow of events). In the illustrated example, the audio sequence sketches events taking place in or near a kitchen in a home.

The audio sequence 5 is preferably composed of various sound bits 59, which are mixed together in a special way, such that there are—for one or more sound objects—portions during which only that respective sound object is sounding and/or only that respective sound object is sounding together with one or more sound objects such as a background noise. And, furthermore, it is composed in such a way that there are portions of the audio sequence when two or more sound objects sound simultaneously. This allows to provide an audio sequence during which several trade-offs between adjustable hearing system parameters can be checked and tested in a controlled way.

For example, each sound object can provide for one track of a multitrack recording. And each sound bit 59 of an object 51,52,53,54,55 can be a digital sample of a real-life acoustic event.

Figure 2:
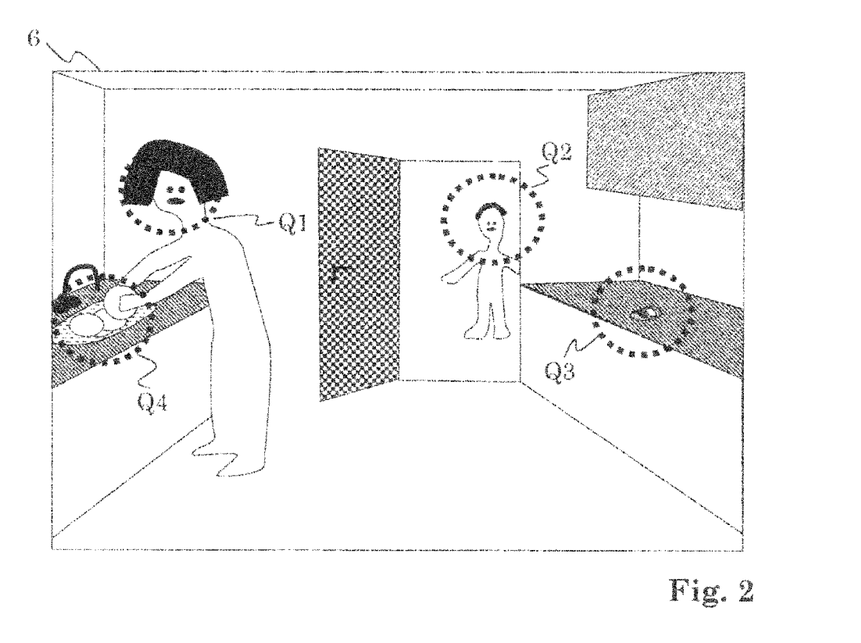
FIG. 2 a schematic illustration of a visualization.

FIG. 2 is a schematic illustration of a visualization 6 belonging to the audio sequence 5 of FIG. 1. The visualization 6 is preferably not static, but provides moving or animated pictures. For example, visualization 6 can be a video sequence.

Typically, all or most of the sound sources sounding during the audio sequence 5 are visible in the visualization, and—as shown in FIG. 2—it is possible to highlight the sound sources Q1,Q2,Q3,Q4 in the visualization 6. In particular, it is possible to highlight sound sources Q1,Q2,Q3, Q4 visible in the visualization 6 at the time they sound and should be perceivable in the audio sequence 5. For example, the lips of a speaking person Q1,Q2 can be animated, clattering dishes Q4 can be shown to be moving while being washed, or a mobile phone Q3 may be vibrating or have a lighted display when it is ringing.

Figure 3:
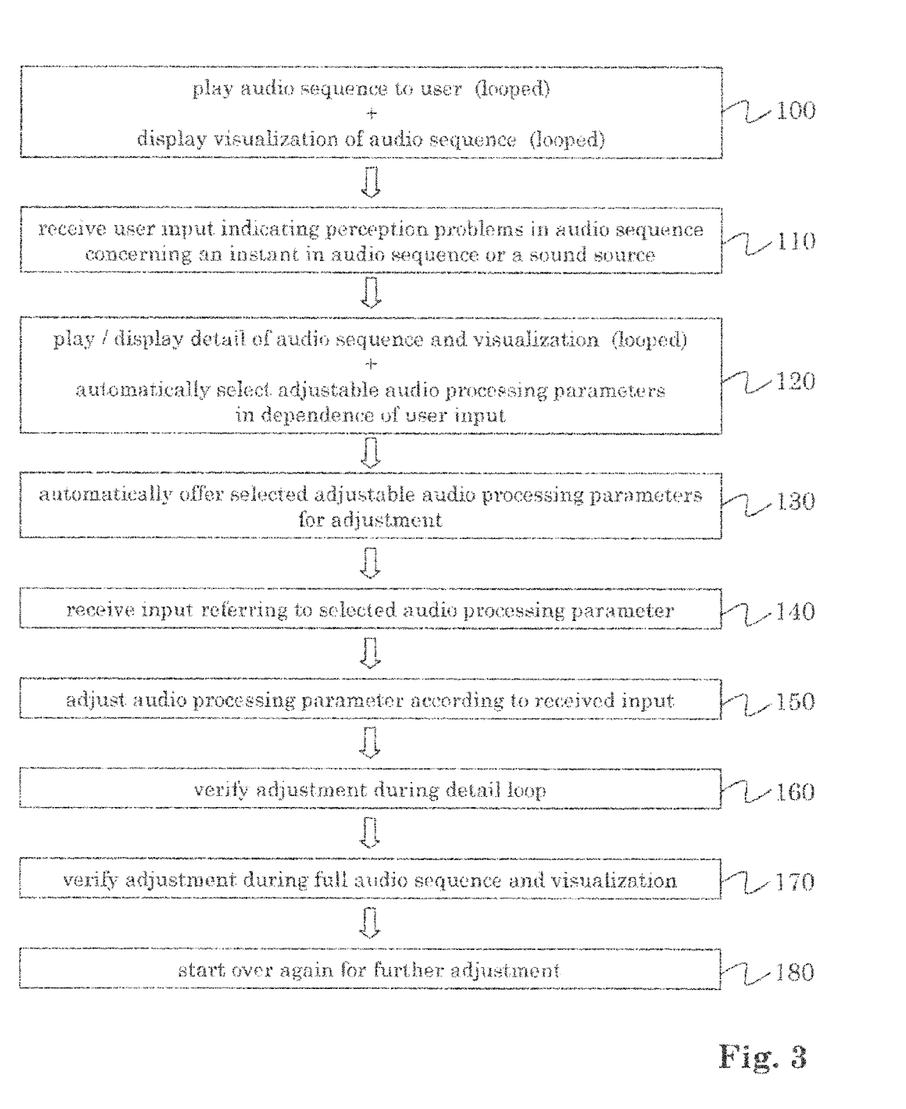
FIG. 3 a block diagram of a fitting method.

In a fitting session during which a hearing system of a hearing system user is adjusted to the preferences of said user, the audio sequence 5 of FIG. 1 and the visualization of FIG. 2 can be used in the way depicted in FIG. 3.

FIG. 3 shows block diagram illustrating a fitting method. In step 100, the audio sequence 5 is played to the hearing system user, either directly via said hearing system, or via loudspeakers, while the user is using his hearing system, perceiving the sound generated by the loudspeakers via his hearing system.

At the same time and synchronously with the audio sequence 5, the visualization 6 is played to the user, typically using a display such as a computer screen. Preferably, audio sequence 5 and visualization 6 are played in a looped fashion, i.e. when audio sequence 5 and visualization 6 are finished, it will start again from the beginning.

In step 110, which preferably takes place during step 100, the user will indicate that there are preception problems—with one of the sound objects or sound sources or at a certain instant or portion during the audio sequence. For example, the user can tell his hearing device professional that the dishes (Q4) are too loud, or that he cannot understand the woman (Q1) while the man (Q2) is talking. The hearing device professional can then enter corresponding information (user input) in a fitting arrangement used in the fitting, e.g., using a computer keyboard or mouse. It is also possible that the user himself provides such a user input to the fitting arrangement, e.g., if a touch screen is used for displaying the visualization 6, the user could, upon occurrence of a perception problem, touch the screen in the place where the sound source responsible for the perception problem is visible.

Thereupon, in step 120, one or more adjustable audio processing parameters of the hearing system are selected in dependence of the user input, i.e. in dependence of the selected point in time during the audio sequence and/or in dependence of the selected sound source/sound object. That selection is automatically carried out by the fitting arrangement. E.g., a look-up table could be provided in the fitting arrangement for this purpose. The possibility of using sound objects corresponding to sound types associated with certain audio processing parameters is possible and has been mentioned before in this application.

Optionally, in step 120, a detail of the audio sequence 5 and the visualization 6 is played, which is selected so as to comprise the problematic portion. Preferably, that detail is played in a loop. This allows to quickly check whether or not parameter adjustments lead to an improved or perhaps event to a worsened perception.

In step 130, the one or more selected audio processing parameters are automatically offered—by the fitting arrangement—for adjustment.

Figure 4:
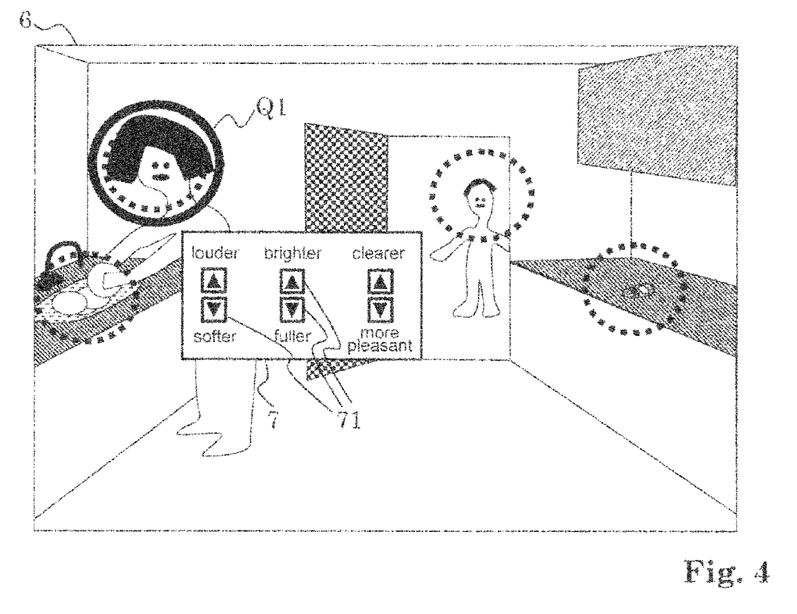
FIG. 4 a schematic illustration of a visualization with an offering of parameters to be adjusted.

FIG. 4 is a schematic illustration of a visualization 6 with an offering of parameters to be adjusted. In step 120, the user has—at a certain instant, e.g., while the woman (Q1) and the man (Q2) talk simultaneously—selected the speaking woman (Q1). Therefore, the woman (source Q1) is highlighted in a special way, in FIG. 4 indicated by the thick solid circle. Thereupon, a parameter display 7 is displayed comprising one or more means 71 for adjusting audio processing parameters, i.e. selected audio processing parameters are offered for adjustment.

In step 140, the fitting arrangement receives an input indicative of a requested change in parameter. This can be accomplished by, e.g., pressing one or more of the displayed parameter changing means 71, or by clicking them with a computer mouse (cf. FIG. 4).

In step 150, the fitting arrangement carries out the requested parameter adjustment.

Figure 5:
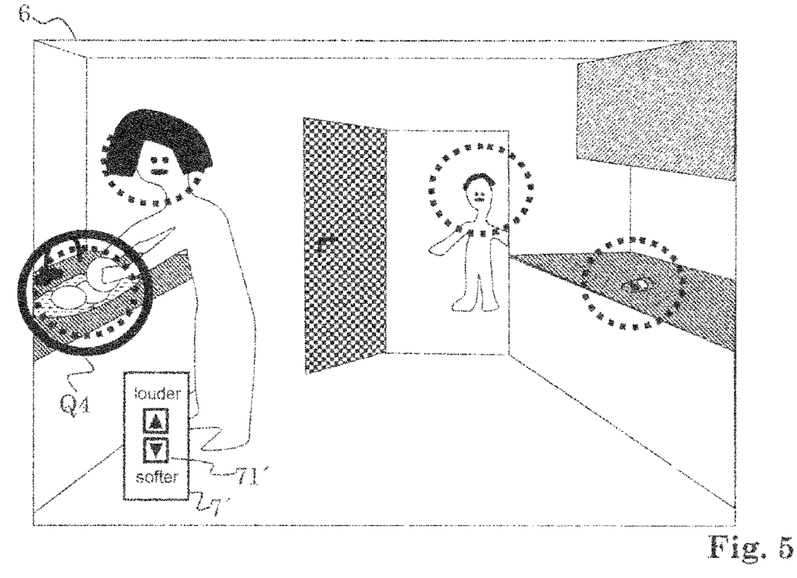
FIG. 5 a schematic illustration of a visualization with an offering of a parameter to be adjusted.

FIG. 5 is a schematic illustration of a visualization with an offering of a parameter to be adjusted. FIG. 5 illustrates, what the visualization could look like, if the dishes (Q4) would have been selected in step 110 (instead of the talking woman Q1 in FIG. 4). As can be seen, the choice of offered adjustable parameters is different from the situation in FIG. 4.

In step 160, the parameter adjustments can be verified during the detail loop of step 120. If the adjustment of step 150 lead to a satisfying result (improved perception), the full audio sequence 5 can be played again, possibly again in a looped fashion (step 170). If the perception problem turns out to be solved, the user can be asked to listen (and look) again at all events in the audiovisual sequence 5,6, so that possibly-existing further perception problems can be detected and solved (step 180). If the adjustment of step 150 did not lead to a satisfying result (still unsatisfactory perception), further adjustments can be made (steps 145, 150), e.g., while still in the detail loop. If an unsatisfactory result turns out during step 170, one could continue with step 110, selecting the crucial instant or sound source again.

Figure 6:
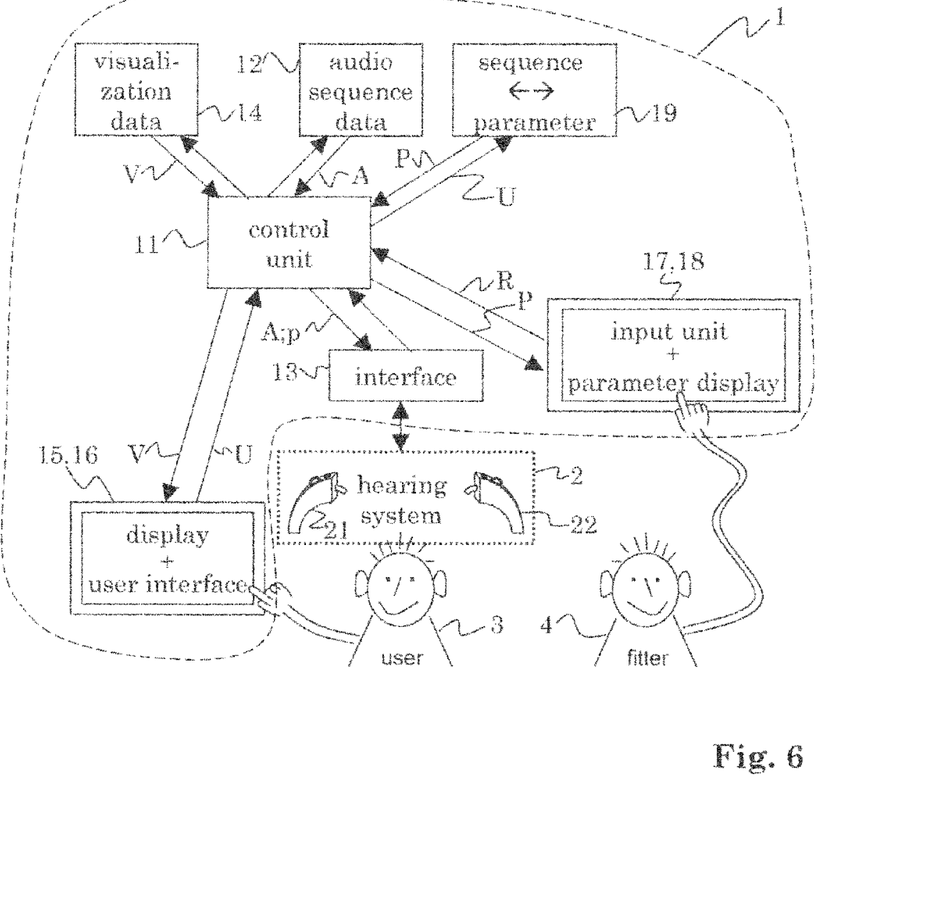
FIG. 6 a schematic illustration of a fitting arrangement and a corresponding fitting method.

FIG. 6 is a schematic illustration of a fitting arrangement 1 and a corresponding fitting method. It will partially be referred to the block diagram of FIG. 3 and to FIGS. 1 and 2.

Fitting arrangement 1 can be or comprise a computer system and a fitting software.

The fitting arrangement 1 of FIG. 6 comprises a control unit 11, three storage units 12,14,19, an interface unit 13, a display unit 15 and a user interface 16 (possibly realized in one unit such as in a touch screen display), and an input unit 17 and a parameter adjusting means 18 (possibly realized in one unit such as in a touch screen display). These components are all operationally connected, typically via control unit 11.

It is, for example, also possible to realize units 15,16,17 and 18 altogether in one unit.

Interface unit 13 interfaces between the arrangement 1 and hearing system 2, which comprises two hearing devices 21,22 worn by user 3. The user 3 is usually assisted by hearing device professional 4 (fitter) during the fitting session.

In order to be able to provide the user 3 with audio sequence 5 (step 100), storage unit 12 comprises data A representative of audio sequence 12, which are fed, controlled by control unit 11, to interface unit 13 and from there to hearing system 2.

In order to be able to provide the user 3 with visualization 6 (step 100), storage unit 14 comprises data V representative of visualization 6, which are fed, controlled by control unit 11, to display unit 15.

When the user 3 or the fitter 4 enters an indication of a perception problem in user interface 16, corresponding data U (user input) are generated and fed to control unit 11 (step 110). In dependence of user input U, data P indicative of one or more audio processing parameters of hearing system 2 to be adjusted will be obtained from storage unit 19 or will be obtained by means of control unit 11 using storage unit 19 (step 120).

The data provided by storage unit 19 can be data relating sound objects and/or sound elements and/or instants of audio sequence 5 to at least one adjustable audio processing parameter of hearing system 2.

Controlled by control unit 11, the selected parameters indicated by data P will be offered for adjustment by parameter adjusting means 18, e.g., by displaying them on a display (step 130), and the fitter 4 (or the user 3) can enter an input R, i.e. a request for parameter adjustment, in input unit 17 (140).

Data R are fed to control unit 11, and corresponding data p descriptive of the requested parameter adjustment will be fed to the hearing system 2 via interface unit 13. Accordingly, the hearing system 2 is adjusted as requested (step 150).

The decision of whether or not to play the audio sequence and which part of it to play and whether or not to play in a loop will be controlled by control unit 11, possibly in dependence of input provided via user interface 16 and/or via input unit 17.

It is possible that the user 3 carries out the method according to the invention without the help of a hearing device professional.

It is possible to dispense with the visualization 6. In particular in fitting binaural hearing devices, the invention can be very helpful even without visualization 6.

It is possible to provide that in visualization 6, all or most of the sound source occuring in the audio sequence 5 are visible, and preferably also that—at least partially—it is visible that and when a sound source generates sound so that the user 3 should be able to perceive that sound. Accordingly, it is—at least in many cases—possible for the hearing system user 3 to judge from the visualization 6 whether or not he properly perceives all (or most of) the sounds that occur during audio sequence 5. Furthermore, it is—at least in many cases—possible for the user 3 to judge whether or not he perceives the spatial arrangement and appearance of the sound sources in accordance with their real arrangement, e.g., as visible in the visualization 6.

It is possible to use any kind of everyday or real-life situation for the invention which provides suitable sound objects, e.g., situations in the street, with car traffic, or situations in a train station or others.

It is possible to use the visualization 6 for enabling a (simple) selection of a sound source (and a corresponding sound object), in particular if perception problems occur in conjunction with the selected sound source or sound object.

An audio sequence comprising a complex composition of at least two or at least three sound objects is used as test signals to be perceived a hearing system user 3 during fitting. The audio sequence can be composed such that trade-offs between adjustable audio processing parameters are very likely to become apparent during the audio sequence 5. The sound objects are preferably real-life sound objects. The audio sequence preferably reflects a real-life situation.

Aspects of the embodiments have—in part—been described in terms of functional units. As is readily understood, these functional units may be realized in virtually any number of hardware and/or software components adapted to performing the specified functions. For example, the input unit 17 can be (fully or in part) identical with user interface 16, or the storage units 12,14,19 can be realized in one unit such as one computer hard disk.

LIST OF REFERENCE SYMBOLS 1 fitting arrangement, computer system
11 control unit
12 storage unit
13 interface unit, interface
14 storage unit
15 display unit, display, TV screen, computer monitor
16 user interface, touch screen display, button, computer mouse
17 input unit, touch screen display, computer keyboard, computer mouse
18 parameter adjusting means, parameter display, slider
19 storage unit
2 hearing system
21 hearing device
22 hearing device
3 user, hearing system user
4 hearing device professional, fitter
5 audio sequence
51, ..., 55 sound object
59 sound bit
6 visualization, video
7,7' parameter offer, parameter display
71,71' parameter adjusting means
100 ... 180 steps
A data, audio data
Q1, ..., Q4 sound sources
p data, data descriptive of parameter adjustment
P data, data indicative of audio processing parameter(s), selected audio processing parameter
R data, input, request for parameter adjustment
U user input
V data, visualization data, video data

The invention claimed is:

1. Method for adjusting a hearing system according to preferences of a hearing aid wearer of said hearing system, said hearing system comprising at least one hearing aid device for improving the hearing perception of said hearing aid wearer and for being worn in or adjacent to an ear of said hearing aid wearer, the method comprising:
playing an audio sequence to said hearing aid wearer, wherein said audio sequence comprises a first sound object representative of a first real-life sound source and a second sound object representative of a second real-life sound source;
providing said hearing aid wearer, synchronously with said playing the audio sequence, with a visualization of a scene to which said audio sequence belongs;
receiving an input from said hearing aid wearer in response to said step of playing the audio sequence to said hearing aid wearer, wherein said input from said hearing aid wearer comprises a selection of a sound source occurring in said visualization;
automatically selecting one or more audio processing parameters of said hearing system in dependence of said input from said hearing aid wearer;
offering at least one audio processing parameter, of the one or more audio processing parameters selected, for adjustment; and
adjusting said at least one audio processing parameter of said at least one hearing aid device in dependence of a further input.

2. The method according to claim 1, wherein said first and said second sound objects sound simultaneously during at least a portion of said audio sequence.

3. The method according to one of claim 1 or 2, wherein—during at least a portion of said audio sequence—said first sound object sounds without said second sound object sounding simultaneously.

4. The method according to claim 1, wherein said input from said hearing aid wearer is indicative of at least one of:
one of the sound objects comprised in said audio sequence; and
a portion of said audio sequence.

5. The method according to one of claim 1, further comprising:
receiving said input from said hearing aid wearer in a fitting arrangement, wherein said fitting arrangement carries out the step of automatically selecting said one or more audio processing parameters of said hearing system in dependence of said input from said hearing aid wearer.

6. Arrangement for adjusting a hearing system according to preferences of a hearing-impaired user of said hearing system, said hearing system comprising at least one hearing aid device for improving the hearing perception of said user and for being worn in or adjacent to an ear of said user, the arrangement comprising:
- a control unit;
- a first interface unit operationally connectable to said control unit and to said hearing system;
- a first storage unit comprising data representative of an audio sequence comprising a first sound object representative of a first real-life sound source and a second sound object representative of a second real-life sound source;
- an input unit operationally connectable to said control unit, for receiving input descriptive of an adjustment of at least one audio processing parameter of said hearing system;
- a display unit;
- a second storage unit comprising data descriptive of a visualization of a scene to which said audio sequence belongs; and
- a user interface for allowing an individual to select at least one of a sound source occurring in said visualization, one of the sound objects comprised in said audio sequence, or an instant in or a portion of said audio sequence, wherein said control unit is configured to:
- play said audio sequence to said user,
- display—using said display unit—said visualization synchronously with playing of said audio sequence,
- automatically select one or more audio processing parameters of said hearing system in dependence of said selection of a sound source occurring in said visualization, one of the sound objects comprised in said audio sequence, or an instant in or a portion of said audio sequence, via the user interface,
- offer at least one audio processing parameter, of said one or more audio processing parameters selected, for adjustment, and
- carry out said adjustment by adjusting said at least one audio processing parameter of said at least one hearing aid device.

7. The arrangement according to claim 6, wherein said audio sequence is composed such that said first and said second sound objects sound simultaneously during at least a portion of said audio sequence.

8. The arrangement according to claim 6, wherein said audio sequence is composed such that—during at least a portion of said audio sequence—said first sound object sounds without said second sound object sounding simultaneously.

9. A non-transitory computer-readable storage medium having stored thereon a computer program product comprising program code to cause a computer system to perform:
- playing an audio sequence to a hearing-impaired user of a hearing system that includes at least one hearing aid device for improving the hearing perception of said user and for being worn in or adjacent to an ear of said user, wherein said audio sequence comprises a first sound object representative of a first real-life sound source and a second sound object representative of a second real-life sound source;
- providing—synchronously with said playing of said audio sequence to said user—a visualization of a scene to which said audio sequence belongs;
- receiving an input in response to said playing of the audio sequence to said user, wherein said input comprises a selection of a sound source occurring in said visualization;
- automatically selecting one or more audio processing parameters of said hearing system in dependence of said input;
- offering at least one audio processing parameter, of the one or more audio processing parameters selected, for adjustment; and
- adjusting said at least one audio processing parameter of said at least one hearing aid device in dependence of said input.

10. The non-transitory computer-readable storage medium according to claim 9, wherein said program code is further adapted to cause said computer system to perform:
- receiving a user input, wherein said user input is indicative of at least one of:
- one of the sound objects comprised in said audio sequence; and
- an instant in or a portion of said audio sequence.

11. The method according to claim 1, wherein said input is disjoint to said at least one audio processing parameter such that said at least one audio processing parameter is among a plurality of audio processing parameters available for adjustment in dependence of said input.

12. The arrangement according to claim 6, wherein said input is disjoint to said at least one audio processing parameter such that said at least one audio processing parameter is among a plurality of audio processing parameters available for adjustment as described by said input.

13. The non-transitory computer-readable storage medium according to claim 9, wherein, in the program code stored thereon, said input is disjoint to said at least one audio processing parameter such that said at least one audio processing parameter is among a plurality of audio processing parameters available for adjustment in dependence of said input.

* * * * *